United States Patent
Wolff

(10) Patent No.: US 8,037,310 B2
(45) Date of Patent: Oct. 11, 2011

(54) DOCUMENT AUTHENTICATION COMBINING DIGITAL SIGNATURE VERIFICATION AND VISUAL COMPARISON

(75) Inventor: Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 1278 days.

(21) Appl. No.: 11/000,635

(22) Filed: Nov. 30, 2004

(65) Prior Publication Data

US 2006/0117182 A1    Jun. 1, 2006

(51) Int. Cl.
H04L 9/32 (2006.01)

(52) U.S. Cl. ........................................ 713/176; 713/181

(58) Field of Classification Search .................. 713/176
See application file for complete search history.

(56) References Cited

U.S. PATENT DOCUMENTS

| | | | |
|---|---|---|---|
| 5,465,299 A * | 11/1995 | Matsumoto et al. | 713/176 |
| 5,586,036 A * | 12/1996 | Pintsov | 705/408 |
| 5,671,282 A | 9/1997 | Wolff et al. | |
| 5,765,176 A * | 6/1998 | Bloomberg | 715/209 |
| 5,912,974 A * | 6/1999 | Holloway et al. | 380/51 |
| 6,039,248 A * | 3/2000 | Park et al. | 235/379 |
| 6,314,517 B1 * | 11/2001 | Moses et al. | 713/156 |
| 6,582,138 B1 * | 6/2003 | Meunier et al. | 400/103 |
| 2002/0035544 A1 * | 3/2002 | Wakao et al. | 705/51 |
| 2002/0061120 A1 | 5/2002 | Carr et al. | |
| 2003/0016385 A1 * | 1/2003 | Matsumoto et al. | 358/1.15 |
| 2003/0051135 A1 * | 3/2003 | Gill et al. | 713/160 |
| 2003/0058354 A1 * | 3/2003 | Parulski et al. | 348/231.6 |
| 2004/0039706 A1 * | 2/2004 | Skowron et al. | 705/51 |
| 2006/0072144 A1 * | 4/2006 | Dowling et al. | 358/1.15 |

FOREIGN PATENT DOCUMENTS

| | | |
|---|---|---|
| EP | 1393927 A | 3/2004 |
| EP | 1445680 A | 5/2004 |
| FR | 2820578 A | 8/2002 |
| GB | 2342531 A | 4/2000 |

OTHER PUBLICATIONS

European Search Report, EP 05025965, Feb. 20, 2006, 9 pages.

* cited by examiner

*Primary Examiner* — Kimyen Vu
*Assistant Examiner* — Yogesh Paliwal
(74) *Attorney, Agent, or Firm* — Patent Law Works LLP

(57) ABSTRACT

A document authentication system and method combine digital and non-electronic (or visual) authentication methodologies in an integrated, unified manner. As well as providing indicia of digital authentication, the invention generates a physical artifact that can be validated by unaided human visual perception. The present invention thus provides an opportunity to improve the level of trust in authentication of documents, while preserving the advantages of both traditional and digital authentication mechanisms.

76 Claims, 6 Drawing Sheets

DOCUMENT AUTHENTICATION COMBINING DIGITAL SIGNATURE VERIFICATION AND VISUAL COMPARISON

FIELD OF THE INVENTION

The present invention relates generally to authenticating documents, and more particularly to methods, systems, and computer program products for generating document authentication indicia that can be verified both digitally and by non-electronic means.

BACKGROUND OF THE INVENTION

Systems and methods exist for generating document authentication indicia that can be verified by conventional, non-electronic means. Such mechanisms have been used for centuries, so as to reassure a reader of a document that the document is authentic, that its source or author is as stated, and that the document has not been tampered with. Such authentication mechanisms can also provide a document recipient with a mechanism for ensuring that the author or signer of a document cannot later repudiate his or her authorship or assent to the document. Examples of mechanisms for performing these functions are handwritten signatures, seals (such as wax, embossed, or ink seals), non-erasable ink, and the like.

More recently, digital means for authenticating documents have emerged. Digital signatures, implemented by a combination of hash operations and asymmetric encryption, provide assurances as to document authenticity and integrity. Digital signatures are generally applied, transmitted, and verified by computers, in a manner that is usually invisible to users. Authors and signers generate digital signatures by activating commands in a software package or operating system, while document recipients and other users can verify signature authenticity by activating validation commands. In many cases, validation takes place automatically upon receipt of a document that requires it.

Each of these two methodologies has its strengths and weaknesses. Digital mechanisms are often more reliable and accurate and may be more convenient as long as the appropriate software and computer equipment are readily available. However, such techniques require complete trust in the computer system and software. Older visual-based methodologies appeal to some users by providing more tangible indicia that can be visually perceived, readily understood, and directly verified; many users consider such visual indicia to be more trustworthy than the mysterious processes that take place in digital mechanisms. Visual methodologies can also be used in situations where a computer is not available or is not convenient.

Since each mechanism has its advantages and disadvantages, it is not uncommon for some users to apply both traditional and digital authentication methods to the same document. However, such approaches do not generally integrate the two types of authentication. Rather, they are often even more cumbersome and inconvenient to apply, and often emphasize the disadvantages of the two methodologies rather than their strengths.

What is needed, then, is a technique that brings together the advantages of both authentication methodologies in a unified approach that streamlines and improves the processes of generating authentication indicia and verifying such indicia. What is further needed is a technique that provides users with the intuitive assurance of a visual authentication methodology, combined with the reliability and convenience of digital authentication methods.

SUMMARY OF THE INVENTION

The present invention provides a new model for document authentication that combines digital and physical (or visual) authentication methodologies in an integrated, unified manner. As well as providing indicia of digital authentication, the system of the present invention generates a physical artifact that can be validated by unaided human visual perception. The present invention thus provides an opportunity to improve the level of trust in authentication of documents, while preserving the advantages of both traditional and digital authentication mechanisms.

In one aspect, the invention operates to generate a document to be authenticated as follows:

1. A device receives a source document 102A to be authenticated. The device includes some sort of scanning or reading mechanism, such as a scanner or multifunction peripheral, for accepting input of this kind.

2. A public key and a reference to a storage location (such as a URL) are provided, either as part of source document 102A or by some other means.

3. The device reads document 102A, optionally encrypts it using the public key, and uploads content from document 102A to the storage location specified by the URL.

4. The device generates a digital signature, for example by computing a hash H1 of the content and then encrypting H1 with a private key.

5. The device prints a new version 102S of the document, including some or all of the content from the source document, along with indicia of authentication such as the generated digital signature and a public key corresponding to the signature. The new version 102S of the document can also contain a URL pointing to the specific storage location that contains the uploaded content. Any or all of these items on the new version can be provided in machine-readable format, such as a barcode.

In one aspect, the invention operates to authenticate document 102S that has been so generated, as follows:

1. A document 102S to be authenticated is provided at a device. The device (which may or may not be the same device that was used to generate the document) includes some sort of scanning or reading mechanism, such as a scanner or multi-function peripheral. Document 102S contains: a) a visually readable representation of content, such as printed words, images, and the like; b) a reference (such as a URL) that points to a stored digital representation of content, where the visually readable representation purports to be equivalent to the stored digital representation; c) a digital signature; and d) the public key of a person who has signed the document, or a reference that points to such a public key. In one aspect of the invention, items b), c), and d) are provided in machine-readable format such as a bar code.

2. The device reads document 102S, and extracts items b), c), and d).

3. The device retrieves the stored digital representation from the URL.

4. The device verifies the digital signature, by for example: applying a hash algorithm to the digital representation retrieved from the URL to derive a hash result H2; and applying the public key of the document signer to decrypt the digital signature to derive result H1. Hash result H2 is compared with hash result H1.

5. If H1=H2, the device then generates a new digital signature for the document by encrypting H1 using a private key associated with the device.

6. The device renders the retrieved digital content into an image suitable for printing.

7. The device (or a connected printer) then prints a new version 102C of the document (printed on a sheet of paper, or generated in some other tangible physical medium, PDF file, or the like) that contains: a) the digital content that was retrieved from the URL and rendered; b) a digital representation (such as a barcode) of the new digital signature generated by the device; and c) a representation of (or reference to) a public key associated with the device. The new digital signature and the other digital content can be printed, for example, as part of a "footer" on document 102C. The footer may also include a barcode or other representation of a URL or other location where the document has been stored. The footer may also include the previous digital signature and public key (items c) and d) from the document provided in step #1), so that the new version 102C of the document constitutes an assertion that the previous digital signature was valid.

A person can then visually compare the output document 102C with previous version 102S (or with a representation of previous version 102S) to ensure that the rendered digital content in document 102C is identical to the visually readable content from the document 102S. If the images match, there is some assurance that the document 102S provided in step 1 is authentic. Thus, authenticity is verified by the combination of: a) visual comparison of the documents 102C and 102S; and b) signature verification of step 4.

In an alternative embodiment, documents 102C and 102S can be compared by electronic means, for example using well-known image comparison and image matching techniques. This can be done in addition to or instead of the visual comparison being performed by a human being.

Furthermore, the new document 102C can be used as additional authenticating indicia, since it includes a new digital signature signifying that document 102C has been "witnessed" by the device.

In addition, multiple checks on the document 102S, or on document 102C, or on any copy or reprint or version of the document, can be performed by scanning the document in any other device that embodies the above-described invention. The resulting printed documents can be visually checked against one another and/or against the original, to provide further assurance of authenticity. Each device that authenticates a document asserts that the digital data retrieved from the indicated URL renders into an image and applies a signature to provide evidence of such assertion.

An example of the application of the present invention is as follows: Two parties sign a paper contract. The device of the present invention scans the contract, uploads the scanned image data to a server identified by a server URL 105R (for example, http://upload.ricoh.com), and generates a digital signature from the scanned image data. The server responds to the upload request with a specific content URL 105S indicating the storage location where the content image is being stored, and the server stores the content image at that location. In one embodiment, the specific filename or directory for content URL 105S is generated based on a hash result on the content image (for example, http://upload.ricoh.com/HASH_1234). Server 100 may generate this content URL 105S, or MFP 101S may do so. The device prints out a new version of the document that includes an authenticity indicator, for example in the document footer. This authenticity indicator includes a reference to the content URL 105S, the digital signature, and the public key of the device. In other examples, server URL 105R and content URL 105S can be identical to one another.

This new version of the document can then be used as verifiable indicia of the authenticity of the document. Any third party can use a device as provided by the present invention to scan the new version of the document and perform the steps outlined above. Comparison of the printed document and the device output yields an indicator that the document is authentic; furthermore, the device's verification of the digital signature (step 4 above) provides digital verification of authenticity. In addition, when the third party scans the document in this manner, the device generates yet another version of the document, this time with the additional indicator that the document has been "witnessed" by the third party's device. This additional indicator may be, for example, a new digital signature as described in step 6 above. Any number of third parties can perform this authentication operation, and the document can therefore be witnessed any number of times.

An advantage of the present invention is that any device operating according to the principles described herein can be used to authenticate any of the digitally signed copies of the document.

In addition, when providing the original document to the device for initial generation of authentication indicia, any number of auxiliary items, such as supplementary pages, documents, photographs, or other media items, can also be provided. These items are also scanned and uploaded to the server. In one aspect of the present invention, thumbnails or other representations of the auxiliary items are included in the printed output generated by the device, so as to provide visual indications of the entirety of the content to which the authentication indicia applies.

By providing physical representations of the content for visual comparison by a user, along with digital verification of signatures, the present invention effectively combines the advantages of both traditional and digital authentication schemes in a unified manner. Such a system is difficult to defeat, as it would detect forgeries of authentication stamps. Simple attempts at forgery, such as physically cutting and pasting authenticity stamps, would be easily detected by a user. More sophisticated attempts, such as scanning a signature and printing it onto another sheet, would be detected when the doctored page were submitted for authentication, since the output version of the document would not match the original.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

Figure 1:
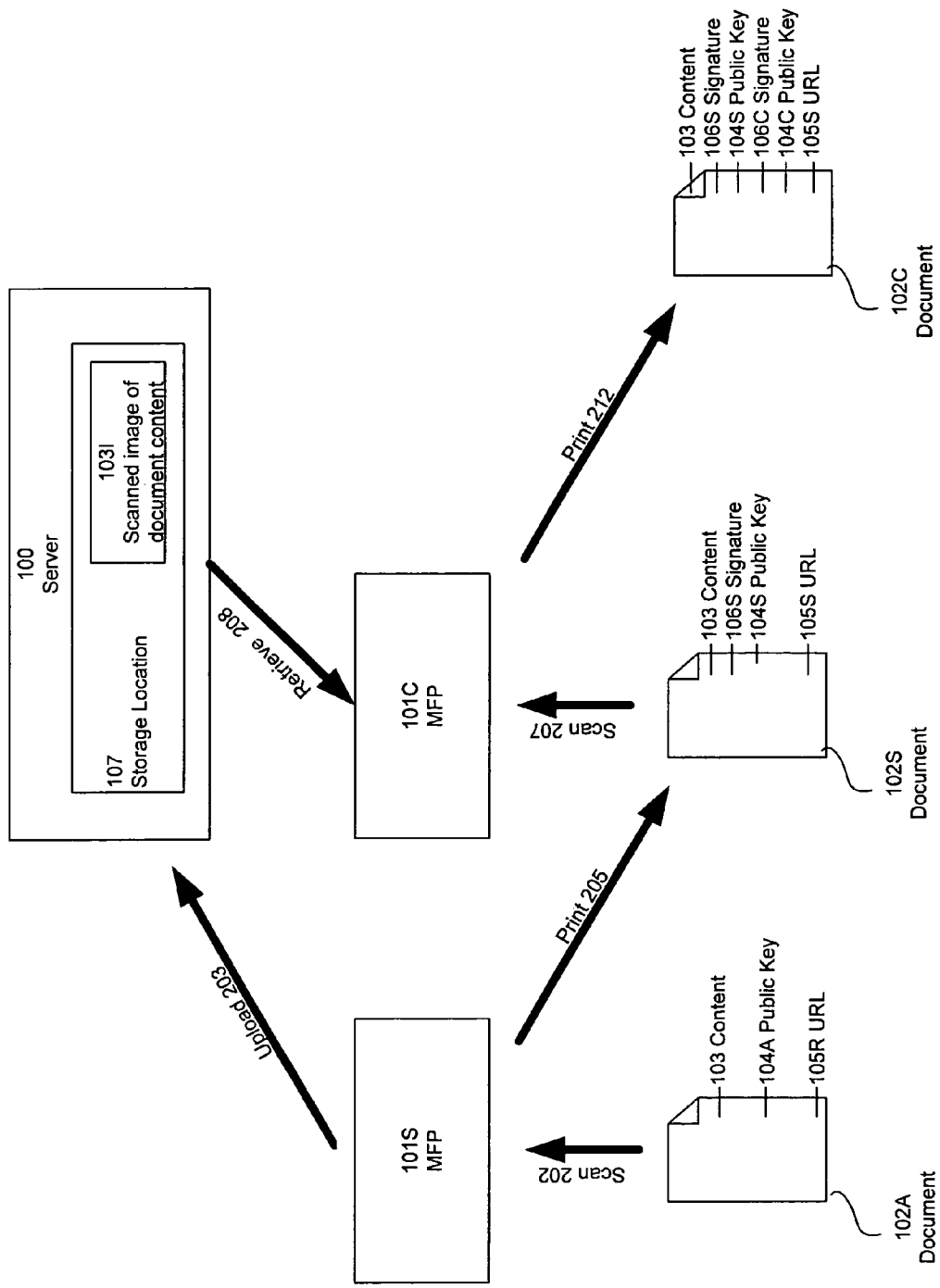
FIG. 1 is a block diagram depicting an overall architecture for one embodiment of the present invention.
Figure 2:
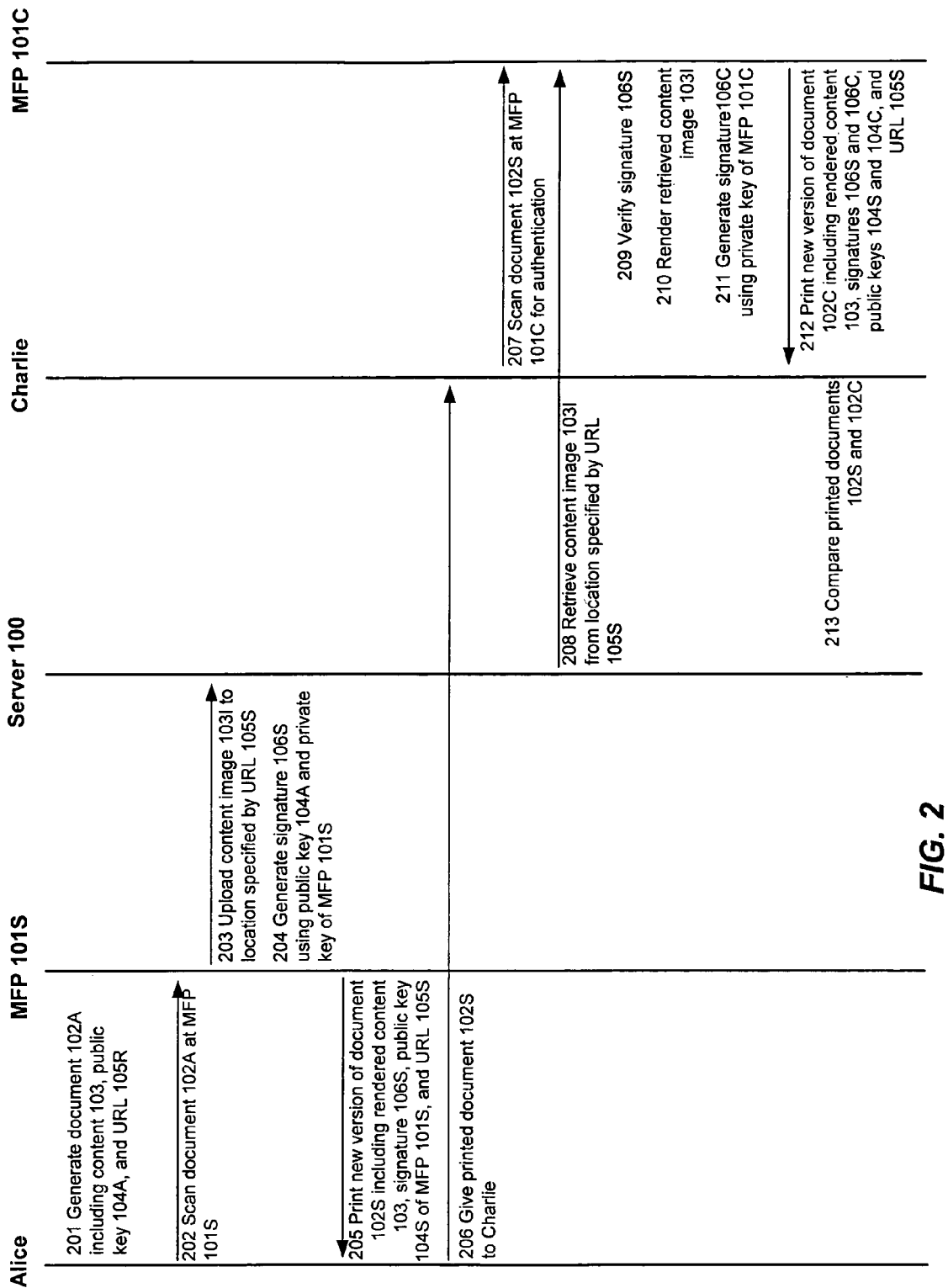
FIG. 2 is an event diagram depicting a method for authenticating a document according to one embodiment of the present invention.

Referring now to FIG. 1, there is shown an overall architecture for one embodiment of the present invention. Referring also to FIG. 2, there is shown an event diagram depicting a method for authenticating a document according to one embodiment of the present invention. For illustrative purposes, FIGS. 1 and 2 depict an arrangement where two multifunction peripherals (MFPs) 101S and 101C are used to practice the present invention. However, one skilled in the art will recognize that the invention can be implemented using a single MFP, or any number of MFPs.

In the example shown, one MFP 101S is used to generate a verifiable document 102S from an original document 102A, while another MFP 101C is used to authenticate document 102S and to generate evidence of such authentication in the form of document 102C. It is assumed, for illustrative purposes, that MFPs 101S and MFP 101C are under the control of two different individuals (called Sally and Charlie, respectively), that they operate independently, and that they may be located remotely from one another.

One skilled in the art will further recognize that the present invention can be implemented using devices other than MFPs. For example, the invention can be implemented using one or more conventional scanners coupled to one or more computers that runs software for executing the steps of the invention. The invention can also be implemented using one or more printers, fax machines, scanners, or the like, either instead of or in addition to the MFPs shown in FIGS. 1 and 2.

In one embodiment, MFPs 101S and 101C of the present invention each include input and output capabilities, such as for example a scanner, keypad, screen, printing mechanism, and the like, as well as network connectivity that allows each MFP 101S, 101C to communicate with other components such as server 100 using well known network protocols such as TCP/IP and HTTP. In one embodiment, the various components of FIG. 1 are located remotely with respect to one another; the present invention can function equally effectively regardless of the actual physical locations of the various components.

Thus, as will be apparent to one skilled in the art, the arrangement of FIG. 1 is intended to be illustrative of one example of an architecture for implementing the present invention, and is not intended to limit the scope of the invention claimed herein to the particular features and components depicted. Similarly, the sequence of steps depicted in FIG. 2 is intended to be illustrative of one example of operation of the present invention, and is not intended to limit the scope of the invention claimed herein to the particular steps or order of steps depicted.

Document 102A is an original document that a first user (referred to herein as Alice) has created or generated 201, or has in her possession. Alice wishes to generate some indicia of authenticity for document 102A. In one embodiment, in addition to including content 103, document 102A also includes public key 104A associated with Alice, and/or uniform resource locator (URL) 105R pointing to server 100 that includes storage location 107 where document content 103 is to be stored. In one embodiment, public key 104A and server URL 105R are provided in machine-readable format, such as a barcode.

Figure 3:
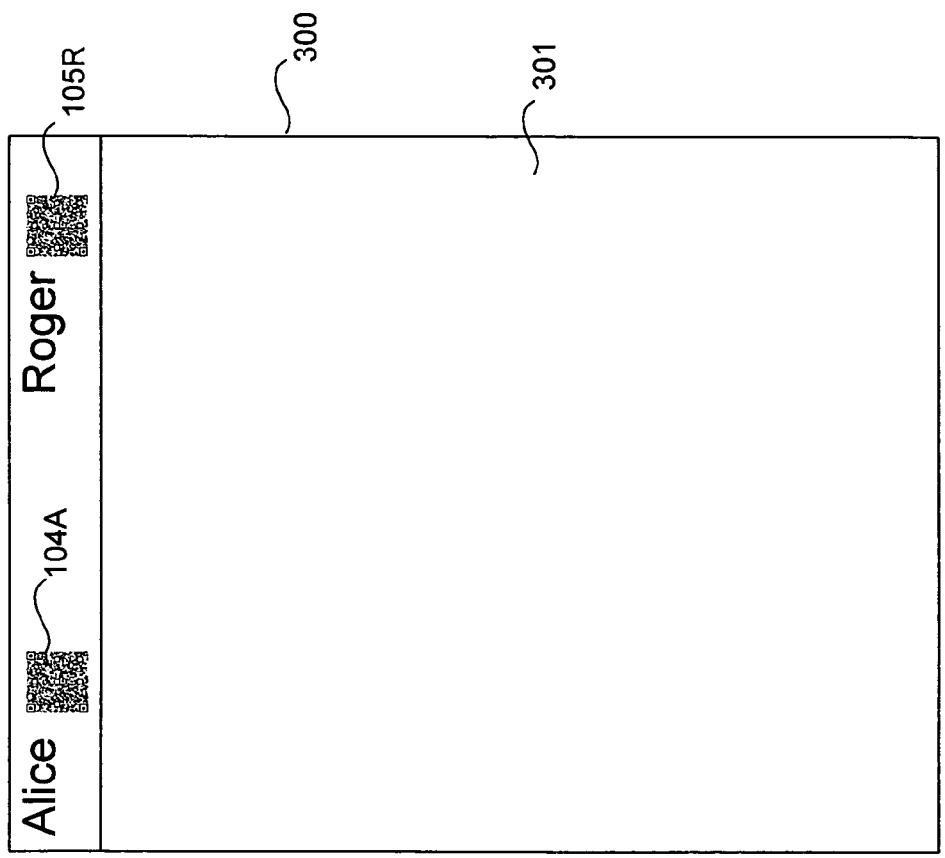
FIG. 3 is an example of a template form for generating documents, according to one embodiment.

For example, Alice may have generated document 102A by writing content 103 on template form 300 such as a piece of standard letterhead that has been pre-printed with public key 104A and server URL 105R. An example of such template form 300 for generating documents is shown in FIG. 3, including public key 104A and server URL 105R, both shown in machine-readable format. Blank area 301 is provided for content 103. One skilled in the art will recognize that the particular form 300 as shown in FIG. 3 is merely an example, and that any other arrangement for such form 300 can be used without departing from the essential characteristics of the invention.

In one embodiment, template form 300 is provided to Alice by an individual (referred to herein as Roger) who has some pre-existing relationship with Alice (for example, her superior or co-worker), and server URL 105R represents a storage location associated with that individual. In one embodiment, Roger retains the private key corresponding to public key 104A on a secure server, which may be server 100 or may be some other machine.

Roger may have pre-existing relationships with other co-workers as well, and may have a different type of template form 300 (with different preprinted public key 104) for each such co-worker.

Additional, auxiliary media items may also be associated with document 102A; for example, Alice may have some photographs or other items in her possession that somehow relate to document 102A. In one embodiment, where document 102A is a multi-page document, public key 104A and server URL 105R are only printed on one page of document 102A (such as the first page); the remaining pages are considered to be auxiliary media items within the context of the following discussion. In other words, only the first page of document 102A is generated on letterhead, and the remaining pages are generated on ordinary paper and are associated with the first page when scanned in. In another embodiment, each page of multi-page document 102A has public key 104A and server URL 105R (in other words; each page is generated on a sheet resembling template form 300).

Figure 4:
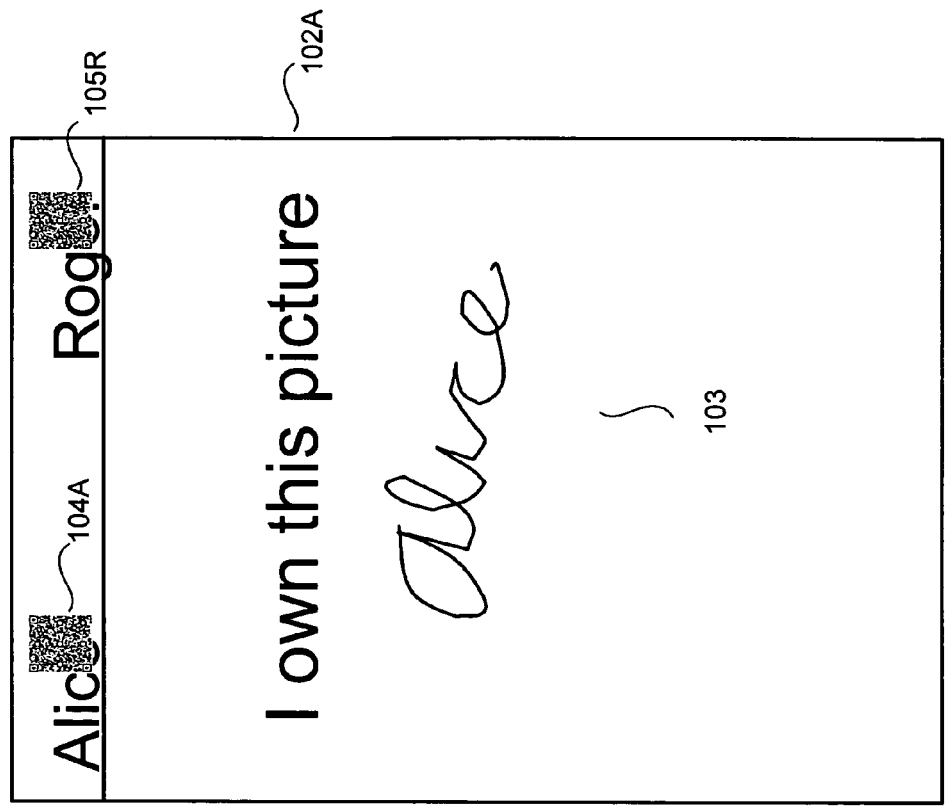
FIG. 4 is an example of a document generated using the template form of FIG. 3.
Figure 4:

Referring now also to FIG. 4, there is shown an example of document 102A generated using template form 300 depicted in FIG. 3. Alice has written content 103 on area 301 of template form 300. Digital photograph 400 is an auxiliary media item associated with document 102A.

Once Alice has generated document 102A, she presents document 102A to MFP 101S, which in this example is associated with or belongs to another individual (referred to herein as Sally) who is responsible for attesting to the authenticity of documents. MFP 101S scans 202 document 102A, for example in response to Alice inserting document 102A in a scanner coupled to or integral to MFP 101S. In one embodiment, Sally need not have any pre-existing relationship with Alice, but is simply associated with MFP 101S where Alice has chosen to generate an verifiable document. If auxiliary media items associated with document 102A exist, MFP 101S scans those as well, for example by reading digital media.

MFP 101S obtains public key 104A and server URL 105R, for example by reading these from document 102A. In embodiments where document 102A does not include server URL 105R, MFP 101S selects or identifies a storage location 107 and/or server 100 by other means, for example in response to Alice or Sally typing in a location at a keypad on MFP 101S or selecting from any number of choices presented on a screen at MFP 101S. Alternatively, a default storage location 107 can be associated with MFP 101S, so that MFP 101S uses that storage location 107 if it does not receive any explicit indication of a server URL 105R at the time document 102A is being scanned.

Similarly, in embodiments where document 102A does not include public key 104A, MFP 101S obtains public key 104A by other means, for example in response to Alice or Sally typing in the key 104A at a keypad on MFP 101S or presenting a key fob, identification card, or other item that contains the public key 104A. Alternatively, a default public key 104A can be associated with MFP 101S, so that MFP 101S uses that public key 104A if it does not receive any explicit indication of a public key 104A at the time document 102A is being scanned.

In yet another embodiment, document 102A provides a reference to (such as a pointer to a storage location for) public key 104A, rather than containing public key 104A itself. In yet other embodiments, as will be recognized by one skilled in the art, the invention is practiced without using a public key 104A.

MFP 101S uploads 203 data representing a scanned image 103I of document content 103 to server 100. As described in more detail below, MFP 101S can encrypt content image 103I using public key 104A before uploading 203 content image 103I. The location of server 100 is specified by server URL 105R, which may also specify the particular storage location 107 within server 100 where document content image 103I is to be stored. In one embodiment, server 100 responds to the upload request with a specific content URL 105S indicating storage location 107 where content image 103I is being stored, and server 100 stores content image 103I at that location 107. In one embodiment, the specific filename or directory for content URL 105S is generated based on a hash result on content image 103I (for example, http://upload.ricoh.com/HASH_1234). Server 100 may generate this content URL 105S, or MFP 101S may do so, or some other component of the system may do so.

If auxiliary media items were scanned, those are uploaded to server 100 as well and stored there together as part of document content image 103I.

Uploaded document content image 103I may be stored in any format such as for example PDF, JPEG, SVG, or the like. It may be compressed or uncompressed, encrypted or non-encrypted.

MFP 101S generates 204 digital signature 106S by conventional digital signature generation methods. As is known in the art, a digital signature may be generated by hashing content image 103I (or an encrypted version of content image 103I) to generate a message digest, and then encrypting the message digest using a private key, so that the message digest can later be decrypted using a public key and compared with an independently-derived message digest. The hash algorithm can be any well-known algorithm, such as Secure Hash Algorithm 1 (SHA1), or the like. In the present invention, MFP 101S generates 204 digital signature 106S by applying a private key such as one associated with MFP 101S or associated with Sally. In other embodiments, uploaded content image 103I can be encrypted; therefore, server 100 or MFP 101C applies decryption to generate hash results and verify signatures. In yet another embodiment, the hash result (or message digest) is left unencrypted; later verification of the hash result then involves independently generating a hash results and comparing it with the previously generated one.

For purposes of the following discussion, the term "digital fingerprint" is used to refer to the message digest, whether it is unencrypted or whether it is encrypted to form a digital signature.

MFP 101S then prints 205 a new version of document 102A, referred to herein as document 102S. This new version 102S includes a representation of content 103, and can also include representations (such as thumbnails) of the auxiliary media items, if any, associated with document 102A. For example, if document 102A is a multi-page document, thumbnails of the various pages can be included on a single-page document 102S.

Document 102S also includes, in one embodiment, representations of digital signature 106S and public key 104S, where public key 104S corresponds to the private key that was used in generating digital signature 106S. In one embodiment, document 102S also includes content URL 105S, which may be a more specific URL than server 105R in that it identifies the specific location 107 within server 100 where document content image 103I is stored. In another embodiment, content URL 105S is identical to server URL 105R. In one embodiment, any or all of 103, 106S, 104S, and 105S are included on the face of document 102S as one or more machine-readable codes such as barcodes. One skilled in the art will recognize, however, that these items can be presented in any format, whether machine-readable, human-readable, or both.

Figure 5:
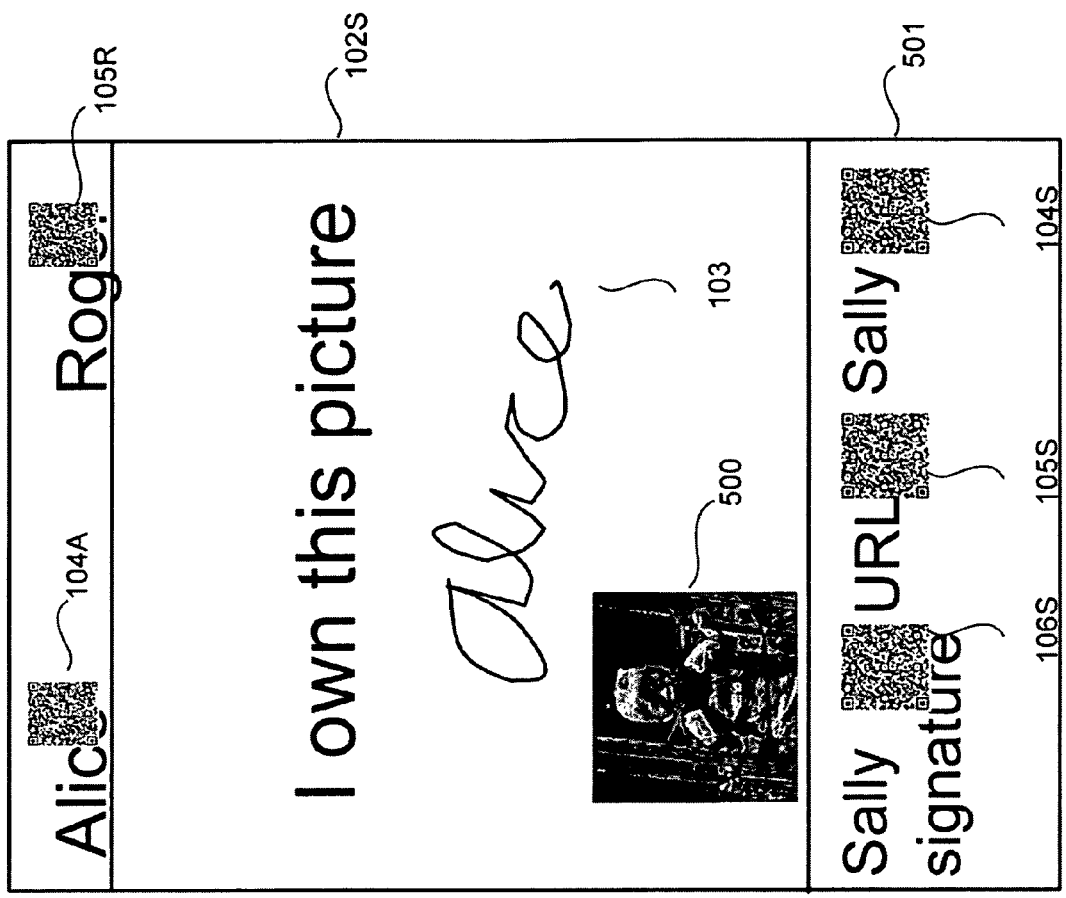
FIG. 5 is an example of the document of FIG. 4 after a device has added a digital signature, URL, and public key according to the techniques of the present invention.

Referring also to FIG. 5, there is shown an example of document 102S as generated by MFP 101S, including content 103 and thumbnail 500 of digital photograph 400. Also included is footer 501 including digital signature 106S, content URL 105S, and public key 104S. Digital signature 106S, content URL 105S, and public key 104S are provided in machine-readable format.

Printed document 102S contains indicia of authenticity in the form of signature 106S. Any MFP can verify the authenticity of signature 106S by applying public key 104S. Document 102A also contains a representation of content 103 originally created by Alice on document 102A, as well as thumbnails 500 or other representations of auxiliary items, if any. Alice (or anyone else) can distribute document 102S to whomever she wishes, and the recipient of document 102S can verify the authenticity of document 102S at any MFP 101 that operates according to the principles described herein.

For example, Alice may decide to give 206 document 102S to an individual referred to herein as Charlie. Charlie can then verify the authenticity of 102S by presenting document 102S to MFP 101C, which can be any MFP such as one associated with Charlie or with some other individual. MFP 101C scans 207 document 102S, and then retrieves 208 document content image 103I from storage location 107 specified by content URL 105S.

MFP 101C then verifies 209 the authenticity of digital signature 106S with respect to the retrieved content image 103I. For example, MFP 101C applies public key 104S to digital signature 106S to obtain a first message digest, and also applies a hash algorithm (such as SHA1) to retrieved content image 103I to independently derive a second message digest. In an embodiment where an unencrypted hash result (message digest) is encoded on document 102S, MFP 101C simply applies a hash algorithm to retrieved content image 103I to independently derive a second message digest; no application of public key 104S is required.

The two message digests are compared electronically; if they match, MFP 101C indicates that digital signature 106S is authentic and that content 103 has not been tampered with. In one embodiment, more than one hash algorithm may be available, so that digital signature 106S is prefixed with or appended with an indication of which hash algorithm is to be used in verifying, authenticity.

MFP 101C then renders 210 document content image 103I retrieved from storage location 107. Rendering 210 can be performed according to a standard well-known mechanism, and usually depends on the format of the retrieved document content image 103I. As described above, content image 103I may be stored in any format such as for example PDF, JPEG, SVG, or the like; a rendering algorithm corresponding to the format is used for rendering 210 document content image 103I.

If desired, MFP 101C can also generate a new version of the document, referred to as document 102C, that contains additional verification indicia which signifies that the document has been authenticated by MFP 101C. To generate this new version 102C, MFP 101C first generates 211 digital signature 106C using conventional digital signature generation methods. For example, MFP 101C may hash content 103 to generate a message digest, and then encrypt the message digest using a private key such as one associated with MFP 101C or associated with Charlie.

MFP 101C then prints 212 new version of document 102C. This new version 102C includes a representation of content 103, and can also include representations (such as thumbnails) of any auxiliary media items retrieved from server 100 that are associated with document 102C. In one embodiment, all auxiliary media items are included with content image 103I in a digital packet stored at location 107.

Document 102C also includes, in one embodiment, representations of digital signature 106C and public key 104C, where public key 104C corresponds to the private key that was used in generating digital signature 106C. In one embodiment, document 102C also includes representations of digital signature 106S and public key 104S as evidence that document 102C has been authenticated by MFP 101S as well as MFP 101C. In one embodiment, document 102C also includes content URL 105S, which identifies the specific location 107 within server 100 where document content image 103I is stored. In one embodiment, any or all of 103, 106S, 104S, 106C, 104C, and 105S are included on the face of document 102C as one or more machine-readable codes such as barcodes. One skilled in the art will recognize, however, that these items can be presented in any format, whether machine-readable, human-readable, or both.

Figure 6:
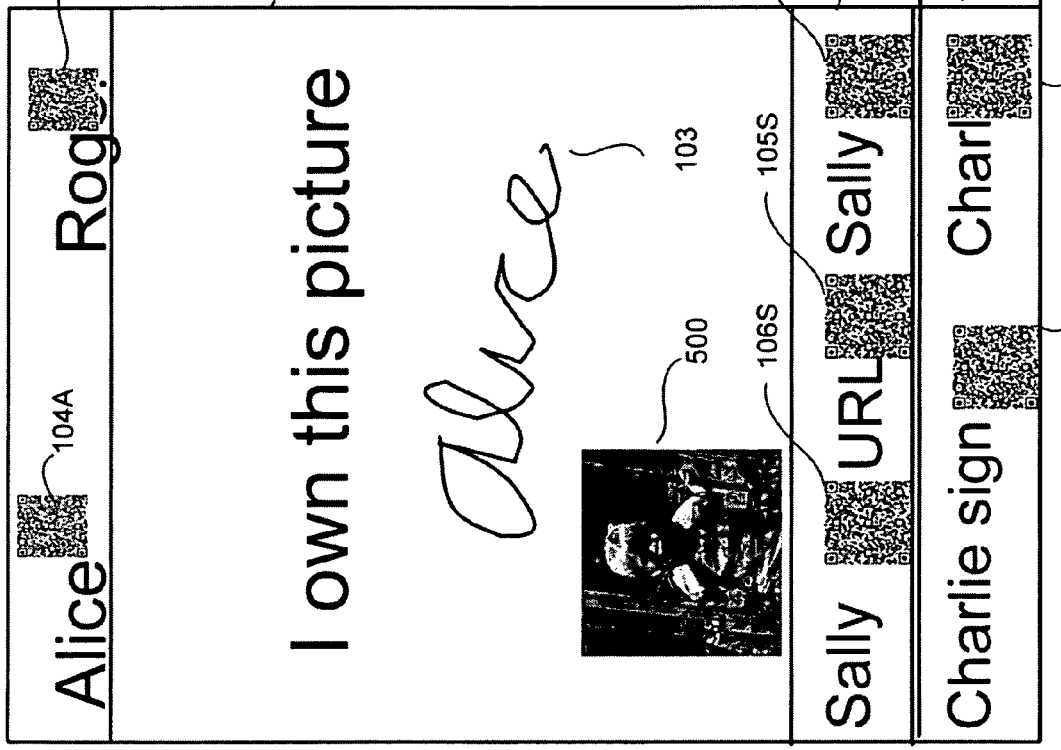
FIG. 6 is an example of the document of FIG. 5 after it has been authenticated according to the techniques of the present invention.

Referring also to FIG. 6, there is shown an example of document 102C as generated by MFP 101C, including the same elements as document 102S of FIG. 5 (content 103, thumbnail 500, and footer 501 including digital signature 106S, content URL 105S, and public key 104S). Document 102C also contains footer 601 including digital signature 106C and public key 106S, both added by MFP 101C. In the example, digital signatures 106S and 106C, content URL 105S, and public keys 104S and 104C are all provided in machine-readable format.

The fact that MFP 101C has successfully verified signature 106S on document 102S provides Charlie with a measure of assurance as to the authenticity of document 102S. Furthermore, Charlie (or anyone) can use the printed new version 102C as evidence of such authentication. Version 102C provides evidence that MFP 101C has verified the authenticity of document 102S, and further attests that both Charlie's and Sally's digital signatures 106C and 106S have been properly applied to document 102S.

Furthermore, Charlie can compare the printed new version 102C with document 102S that he received from Alice, in order to visually ascertain whether content 103 on the two documents is identical. Since content 103 on document 102C was retrieved from server 100, any tampering that has been done to content 103 on document 102S would cause documents 102S and 102C to fail to match one another. This visual check provides a further measure of confidence in the authenticity of document 102S. Thus, the present invention provides a useful technique whereby authenticity of a document (such as document 102S) can be checked by visual means as well as electronically.

In one embodiment, in steps 203 through 205 above, further verification of the authenticity of the content 103 of document 102S can be provided. This further verification can be generated and provided as follows:

After document 102A has been scanned 202 by MFP 101S, content image 103I is encrypted using public key 104A that is associated with Alice. Only the encrypted version of content image 103I is uploaded 203 to server 100; any unencrypted copy of content image 103I is destroyed. Then, only a holder of a private key associated with public key 104A can decrypt the version of content image 103I that is uploaded 203 to server.

Another person having access to the private key associated with public key 104A, such as Roger, decrypts content image 103I and verifies that it is bona fide content 103 associated with its author Alice. Roger makes this determination based on his pre-existing relationship with Alice, which may dictate certain parameters that Roger checks for when reviewing documents purporting to authored by Alice. For example, if Roger is Alice's co-worker or superior, he knows what kind of content Alice might be providing or is authorized to produce, and can vouch for its integrity or authenticity. Once Roger has determined that content 103 is bona fide, Roger makes content image 103I available in decrypted form at server 100, so that it can later be downloaded, rendered, and output by MFP 101C (or other devices or entities). If no such verification of authenticity is available, content image 103I is not made available in decrypted form at server 100. In this embodiment, then, the availability of content image 103I in decrypted form at server 100 signifies that some entity (Roger) has attested to the authorship and/or authenticity of content image 103I. Roger can indicate whether or not he attests to the authenticity of content image 103I by the use, for example, of a user interface on a client computer connected to server 100.

Alternatively, Roger applies his own digital signature to content image 103I as attestation of authorship and/or authenticity of content image 103I. In this variation, the decrypted version of content image 103I can be made available whether or not Roger's attestation has been applied. However, if no attestation of authorship and/or authenticity has been made, the stored content image 103I at server 100 will not include Roger's signature. Then, Charlie (or anyone else) can check for Roger's signature on content image 103I retrieved in step 208 to determine whether or not there is attestation of authorship and/or authenticity. Then, even if no such attestation is available, Charlie (or anyone else) can still choose to print and/or use content 103 and can perform the other forms of authentication described above as long as the decrypted version of content image 103I is available.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for authenticating a first document by an authentication device, the first document comprising a visual representation of content and a first digital fingerprint, the method comprising:

associating the first document with at least one auxiliary document, the visual representation of content of the first document including at least a portion of the at least one auxiliary document;

reading the first document to obtain the first digital fingerprint and an indicator of a storage location for the content;

determining the storage location for the content based on the indicator;

retrieving content stored at the determined storage location;

outputting, for visual verification by a human, the first document with the first digital fingerprint and a human-readable tag identifying an entity associated with the first digital fingerprint;

verifying the first digital fingerprint;

generating authentication indicia for the first document, the authentication indicia comprising a representation of at least a portion of the retrieved content and providing an assertion that the authentication device has authenticated the first document and the content has not been modified; and outputting a new version of the first document having a footer comprising the authentication indicia.

2. The method of claim 1, wherein the digital fingerprint comprises a hash result.

3. The method of claim 1, wherein reading the first document to obtain the first digital fingerprint comprises scanning the first document to obtain the first digital fingerprint.

4. The method of claim 1, wherein the indicator of the storage location is displayed as a barcode.

5. The method of claim 1, wherein the indicator of storage location comprises a uniform resource locator.

6. The method of claim 1, wherein the first digital fingerprint comprises a first digital signature.

7. The method of claim 6, wherein verifying the first digital fingerprint comprises:

applying a hash algorithm to at least a portion of the retrieved content to derive a first hash result;

applying a public key to the first digital signature to obtain a second hash result; and comparing the first and second hash results.

8. The method of claim 7, wherein the first document comprises the public key.

9. The method of claim 7, wherein the first document comprises a pointer to the public key.

10. The method of claim 1, wherein verifying the first digital fingerprint comprises:
   applying a hash algorithm to at least a portion of the retrieved content to derive a first hash result;
   comparing the first hash result with the first digital fingerprint.

11. The method of claim 1, comprising comparing the visual representation of content on the first document with the retrieved content.

12. The method of claim 1, comprising electronically comparing the visual representation of content on the first document with the retrieved content.

13. The method of claim 12 wherein generating authentication indicia is performed responsive to the electronic comparison.

14. The method of claim 1, comprising, prior to generating authentication indicia for the first document:
   rendering at least a portion of the retrieved content.

15. The method of claim 14, wherein the retrieved content is in a document file format.

16. The method of claim 14, wherein the retrieved content is in a file format capable of being rendered into human-readable form.

17. The method of claim 14, wherein the retrieved content comprises at least one selected from the group consisting of:
   a portable document format file;
   a word processor file;
   an image file;
   a multimedia file;
   a spreadsheet file;
   a text file;
   a hypertext file;
   an HTML file; and
   an XML file.

18. The method of claim 1, wherein the authentication indicia comprises a new version of the first document.

19. The method of claim 1, wherein outputting the authentication indicia comprises outputting a new version of the first document having a machine-readable code comprising the authentication indicia.

20. The method of claim 1, wherein outputting the authentication indicia comprises outputting a new version of the first document that is visually comparable to the first document.

21. The method of claim 1, wherein outputting the authentication indicia comprises printing a physical document representing the authenticated first document.

22. The method of claim 1, wherein outputting the authentication indicia comprises printing a second document comprising a representation of at least a portion of the first document.

23. The method of claim 1, wherein the visual representation of at least the portion of the at least one auxiliary document comprises at least one thumbnail representing the at least one auxiliary document.

24. The method of claim 1, wherein the first digital fingerprint comprises a first digital signature, and wherein the assertion that the authentication device has authenticated the first document comprises a second digital signature.

25. The method of claim 24, wherein the authentication indicia comprises a representation of a public key for validating the second digital signature.

26. The method of claim 24, wherein verifying the first digital signature comprises:
   applying a hash algorithm to the retrieved content to derive a first hash result;
   applying a public key to the first digital signature to obtain a second hash result;
   comparing the first and second hash results; and
   the method comprising, prior to generating authentication indicia, generating the second digital signature by encrypting the first hash result.

27. The method of claim 24, wherein the authentication device comprises a document authenticating device, and wherein the authentication indicia comprises at least one selected from the group consisting of:
   the first digital signature;
   a representation of a public key for validating the first digital signature;
   the second digital signature; and
   a representation of a public key for validating the second digital signature.

28. The method of claim 1, wherein the first digital fingerprint comprises a first digital signature, the authentication device comprises a document authenticating device, and the authentication indicia comprises at least one selected from the group consisting of:
   the first digital signature; and
   a representation of a public key for validating the first digital signature.

29. The method of claim 1, wherein the authentication indicia comprises an indicator of a storage location for the first document.

30. The method of claim 1 wherein the first document is a printed document.

31. The method of claim 30, wherein the first document is printed on paper.

32. The method of claim 1, wherein the first document is in electronic form.

33. The method of claim 32, wherein the first document is in a portable document format.

34. A method for authenticating a first document by an authentication device, the first document comprising a visual representation of content, the method comprising:
   associating the first document with at least one auxiliary document, the visual representation of content of the first document including at least a portion of the at least one auxiliary document;
   reading an indicator of a storage location from the first document;
   determining the storage location corresponding to the first document based on the indicator;
   retrieving content stored at the indicated storage location;
   verifying a digital fingerprint associated with the first document;
   rendering the retrieved content;
   outputting, for visual verification by a human, the first document with the digital fingerprint and a human-readable tag identifying an entity associated with the digital fingerprint;
   generating an authentication indicia for the first document, the authentication indicia comprising a representation of at least a portion of the retrieved content and providing an assertion that the first document has been authenticated and the content has not been modified; and
   outputting a new version of the first document having a footer comprising the authentication indicia.

35. The method of claim 34, wherein the indicator of the storage location is displayed as a barcode.

36. The method of claim 34, wherein the digital fingerprint comprises a digital signature.

37. The method of claim 34, wherein the digital fingerprint associated with the first document is printed on the first document.

38. The method of claim 37, wherein the digital fingerprint comprises a digital signature.

39. The method of claim 34, wherein the first document is a printed document, the method comprising scanning the printed document.

40. The method of claim 34, wherein the first document is in electronic form, the method comprising receiving the first document by electronic means.

41. The method of claim 34 comprising comparing, by a user, the rendered content with the visual representation of content on the first document.

42. The method of claim 34, comprising determining whether a third party has attested to the authenticity of the retrieved content.

43. The method of claim 42, wherein the retrieved content comprises a digital signature, and wherein determining whether the third party has attested to the authenticity of the retrieved content comprises validating the digital signature on the retrieved content.

44. The method of claim 42, wherein determining whether the third party has attested to the authenticity of the retrieved content comprises determining whether the retrieved content is in decrypted form.

45. A computer program product for authenticating a first document by an authentication device, the first document comprising a visual representation of content and a first digital fingerprint, the computer program product comprising:
 a non-transitory computer-readable medium; and
 computer program code, encoded on the medium, for:
  associating the first document with at least one auxiliary document, the visual representation of content of the first document including at least a portion of the at least one auxiliary document;
  reading the first document to obtain the first digital fingerprint and an indicator of a storage location for the content;
  determining the storage location for the content based on the indicator;
  retrieving content stored at the determined storage location;
  outputting, for visual verification by a human, the first document with the first digital fingerprint and a human-readable tag identifying an entity associated with the first digital fingerprint;
  verifying the first digital fingerprint;
  generating authentication indicia for the first document, the authentication indicia comprising a representation of at least a portion of the retrieved content and providing an assertion that the authentication device has authenticated the first document and the content has not been modified; and
  outputting a new version of the first document having a footer comprising the authentication indicia.

46. The computer program product of claim 45, wherein the first digital fingerprint comprises a hash result.

47. The computer program product of claim 45, wherein the indicator of the storage location is displayed as a barcode.

48. The computer program product of claim 45, wherein the first digital fingerprint comprises a first digital signature.

49. The computer program product of claim 48, wherein the computer program code for verifying the first digital signature comprises computer program code for:
 applying a hash algorithm to at least a portion of the retrieved content to derive a first hash result;
 applying a public key to the first digital signature to obtain a second hash result; and
 comparing the first and second hash results.

50. The computer program product of claim 45, comprising computer program code for, prior to generating authentication indicia for the first document:
 rendering at least a portion of the retrieved content.

51. The computer program product of claim 50, wherein the retrieved content comprises at least one selected from the group consisting of:
 a portable document format file;
 a word processor file;
 an image file;
 a multimedia file;
 a spreadsheet file;
 a text file;
 a hypertext file;
 an HTML file; and
 an XML file.

52. The computer program product of claim 45, wherein the computer program code for outputting the authentication indicia comprises computer program code for outputting a new version of the first document having a machine-readable code comprising the authentication indicia.

53. The computer program product of claim 45, wherein the computer program code for outputting the authentication indicia comprises computer program code for outputting a new version of the first document that is visually comparable to the first document.

54. The computer program product of claim 45, wherein the computer program code for outputting the authentication indicia comprises computer program code for printing a physical document representing the authenticated first document.

55. The computer program product of claim 45, wherein outputting the authentication indicia comprises computer program code for printing a second document comprising a representation of at least a portion of the first document.

56. The computer program product of claim 45, wherein the first digital fingerprint comprises a first digital signature, and wherein the assertion that the authentication device has authenticated the first document comprises a second digital signature.

57. The computer program product of claim 56, wherein the computer program code for verifying the first digital signature comprises computer program code for:
 applying a hash algorithm to the retrieved content to derive a first hash result;
 applying a public key to the first digital signature to obtain a second hash result; and
 comparing the first and second hash results; and
 the computer program product further comprising computer program code for, prior to generating authentication indicia, generating the second digital signature by encrypting the first hash result.

58. A computer program product for authenticating a first document by an authentication device, the first document comprising a visual representation of content, the computer program product comprising:
 a non-transitory computer-readable medium; and
 computer program code, encoded on the medium, for:
  associating the first document with at least one auxiliary document, the visual representation of content of the first document including at least a portion of the at least one auxiliary document;
  reading an indicator of a storage location from the first document;
  determining the storage location corresponding to the first document based on the indicator;
  retrieving content stored at the indicated storage location;

verifying a digital fingerprint associated with the first document;
rendering the retrieved content;
outputting, for visual verification by a human, the first document with the digital fingerprint and a human-readable tag identifying an entity associated with the digital fingerprint;
generating, in response to the visual verification, an authentication indicia for the first document, the authentication indicia comprising a representation of at least a portion of the retrieved content and providing an assertion that the first document has been authenticated and the content has not been modified; and
outputting a new version of the first document having a footer comprising the authentication indicia.

59. The computer program product of claim 58, wherein determining a storage location comprises reading an indicator of storage location from the first document.

60. The computer program product of claim 59, wherein the digital fingerprint comprises a digital signature.

61. A system for authenticating a first document, the first document comprising a visual representation of content and a first digital fingerprint, the system comprising:
a scanner for reading the first document to obtain the first digital fingerprint and an indicator of a storage location for the content and for reading at least one auxiliary document that is associated with the first document, the visual representation of the first document including at least a portion of the at least one auxiliary document;
a storage device for storing content corresponding to the first document and the at least one auxiliary document;
a digital fingerprint authenticator, coupled to the scanner, for verifying the first digital fingerprint;
a processor, coupled to the digital fingerprint authenticator and communicatively coupled to the storage device, for retrieving content from the storage device based on the indicator and for generating authentication indicia for the first document, the authentication indicia comprising a representation of at least a portion of the retrieved content and providing an assertion that the system has authenticated the first document and the content has not been modified; and
an output device coupled to the storage device, for outputting for visual verification by a human the first document with the first digital fingerprint and a human-readable tag identifying an entity associated with the first digital fingerprint and for outputting a new version of the first document having a footer comprising the authentication indicia.

62. The system of claim 61, wherein the first digital fingerprint comprises a hash result.

63. The system of claim 61, wherein the indicator identifies a location within the storage device.

64. The system of claim 61, wherein the first digital fingerprint comprises a first digital signature.

65. The system of claim 64, wherein the digital fingerprint authenticator verifies the first digital fingerprint by:
applying a hash algorithm to at least a portion of the retrieved content to derive a first hash result;
applying a public key to the first digital signature to obtain a second hash result; and
comparing the first and second hash results.

66. The system of claim 61, comprising a renderer for rendering at least a portion of the retrieved content.

67. The system of claim 66, wherein the retrieved content comprises at least one selected from the group consisting of:
a portable document format file;
a word processor file;
an image file;
a multimedia file;
a spreadsheet file;
a text file;
a hypertext file;
an HTML file; and
an XML file.

68. The system of claim 61, wherein the output device outputs a new version of the first document having a machine-readable code comprising the authentication indicia.

69. The system of claim 61, wherein the output device outputs a new version of the first document that is visually comparable to the first document.

70. The system of claim 61, wherein the output device comprises a printer, for printing a physical document representing the authenticated first document.

71. The system of claim 61, wherein the output device comprises a printer, for printing a second document comprising a representation of at least a portion of the first document.

72. The system of claim 61, wherein the first digital fingerprint comprises a first digital signature, and wherein the assertion that the system has authenticated the first document comprises a second digital signature.

73. The system of claim 72, wherein the digital fingerprint authenticator verifies the first digital signature by:
applying a hash algorithm to the retrieved content to derive a first hash result;
applying a public key to the first digital signature to obtain a second hash result; and
comparing the first and second hash results; and
wherein the processor, prior to generating authentication indicia, generates the second digital signature by encrypting the first hash result.

74. A system for authenticating a first document by an authentication device, the first document comprising a visual representation of content, the system comprising:
a scanner, for reading the first document to be authenticated including an indicator of a storage location and for reading at least one auxiliary document that is associated with the first document, the visual representation of the first document including at least a portion of the at least one auxiliary document;
a storage device for storing content corresponding to the first document;
a digital fingerprint authenticator, coupled to the scanner, for verifying a digital fingerprint associated with the first document;
a renderer, communicatively coupled to the storage device, for retrieving content from the storage device according to the storage location specified by the indicator and for rendering the retrieved content;
an output device, coupled to the renderer, for outputting for visual verification the first document with the digital fingerprint and a human-decipherable tag identifying an entity associated with the digital fingerprint; and
a processor, coupled to the storage device, for generating, in response to the visual verification, an authentication indicia for the first document, the authentication indicia comprising a representation of at least a portion of the retrieved content and providing an assertion that the first document has been authenticated and the content has not been modified;

wherein the output device outputs a new version of the first document having a footer comprising the authentication indicia.

75. The system of claim 74, wherein the scanner reads an indicator of storage location from the first document.

76. The system of claim 75, wherein the digital fingerprint comprises a digital signature.

* * * * *